United States Patent

Yamamoto et al.

[11] Patent Number: 6,166,171
[45] Date of Patent: Dec. 26, 2000

[54] POLYAMIDE RESIN COMPOSITION

[75] Inventors: Koji Yamamoto; Makoto Takahashi; Hisashi Shimazaki; Katsuya Maruyama, all of Kanagawa-ken, Japan

[73] Assignee: Mitsubishi Gas Chemical Company, Inc., Tokyo, Japan

[21] Appl. No.: 09/259,611

[22] Filed: Mar. 1, 1999

[30] Foreign Application Priority Data

Mar. 6, 1998 [JP] Japan .................................. 10-055054

[51] Int. Cl.[7] ........................... C08G 73/10; B32B 27/00; C08L 77/00
[52] U.S. Cl. ........................ 528/310; 528/170; 528/312; 528/313; 528/319; 528/322; 528/332; 528/335; 528/336; 428/220; 428/474.4; 428/474.5; 428/474.7; 428/474.9; 525/420; 525/432
[58] Field of Search ..................................... 528/170, 310, 528/312, 313, 319, 322, 332, 335, 336; 428/220, 474.4, 475.5, 474.7, 474.9; 525/420, 432

[56] References Cited

U.S. PATENT DOCUMENTS 5,268,219  12/1993  Harada et al. .......................... 525/432

FOREIGN PATENT DOCUMENTS 4-198329   7/1992   Japan .
10-147711  6/1998   Japan .

*Primary Examiner*—P. Hampton-Hightower
*Attorney, Agent, or Firm*—Frishauf, Holtz, Goodman, Langer & Chick, P.C.

[57] ABSTRACT

A polyamide resin composition comprising 100 parts by weight of a polyamide resin and 0.005 to 1.0 part by weight of at least one compound selected from the group consisting of a metal salt of a fatty acid, a diamide compound and a diester compound. The polyamide resin is obtained by solid phase-polymerizing a polyamide resin prepared by melt-polymerizing a diamine component containing 70 mol % or more of metaxylylenediamine and a dicarboxylic acid component containing 70 mol % or more of adipic acid, and preferably has a relative viscosity of 2.3 to 4.2 when measured at 25° C. using a solution of 1 g polyamide resin in 100 ml of 96% sulfuric acid. By adding at least one compound selected from the group consisting of the specific metal salt of fatty acid, the diamide compound and the diester compound to a solid phase-polymerized polyamide resin, shaped articles such as films, sheets and hollow containers made of the solid phase-polymerized polyamide are improved in the resistance to whitening during storage tinder a high humid condition, upon contacting with water or boiling water, or upon heating to a glass transition temperature or higher.

20 Claims, No Drawings

POLYAMIDE RESIN COMPOSITION

BACKGROUND OF THE INVENTION

1. Field of the Invention

The present invention relates to a polyamide resin composition with an excellent whitening resistance, comprising a polyamide, as a main component, obtained by melt-polymerizing and subsequently solid phase-polymerizing a mixture of a diamine component containing 70 mol % or more of metaxylylenediamine and a dicarboxylic acid component containing 70 mol % or more of adipic acid. Also, the present invention relates to a shaped article such as a film, a sheet and a hollow container obtained by extruding or molding the resin composition.

2. Background Information

Polyamide resins (hereinafter referred to as "polyamide MXD6") obtained by a condensation polymerization of metaxylylenediamine and adipic acid have been widely utilized in manufacturing a gas barrier, multi-layered article, because they are excellent in both a gas barrier property and thermal stability at melting, and co-extrudable or co-injection moldable with another thermoplastic resin such as polyethylene terephthalate, nylon 6 (polyamide 6), polyethylene and polypropylene.

However, the polyamide MXD6 being in an amorphous non-stretched state or an amorphous low-stretched state is crystallized with whitening when heated to a glass transition temperature or higher, stored under a high humid condition, or brought into contact with water or a boiling water, thereby degrading its transparency. Therefore, the use thereof under a high humid condition or under a condition contacting with water has been limited. In particular, a polyamide MXD6 for use in the form of film or sheet, obtained by a melt polymerization and a subsequent solid phase polymerization to have a specific relative viscosity, has an even lower crystallization rate, thereby being easily crystallized with whitening. The polyamide MXD6 crystallized with whitening is reduced in its mechanical properties, especially in impact resistance.

Japanese Patent Application Laid-Open No. 4-198329 by one of the inventors discloses a polyamide composition comprising a polyamide MXD6 and another specific polyamide, such as polyamide 6, having a high crystallization rate. Although a film and sheet made of the proposed polyamide composition advantageously retain an excellent transparency even under a high humid condition, the film and sheet have a reduced gas barrier property due to the addition of another polyamide, as compared with a film and sheet made of a polyamide MXD6 alone. In addition, the sole use of a polyamide MXD6 obtained by a solid phase polymerization fails to achieve the maintenance of its transparency.

A composite material, so-called polyamide 6-clay hybrid, where clay minerals of molecular size are dispersed in polyamide 6 to ion-bond to the polyamide 6, has an increased visible-light transmittance as compared with the polyamide 6 because a growth of spherulite in the composite material is prevented by a clay layer to control the size of spherulite to the wave length of the visible light or smaller, as described in "Shin Sozai" December 1996, page 17. A similar effect is expected for the polyamide MXD6 because it is also crystallizable. To exhibit such an effect, 1% or more of clay minerals are required to be added. However, a film and sheet made of a polyamide MXD6 containing 1% or more of clay minerals are insufficient in mechanical properties such as impact strength.

OBJECT AND SUMMARY OF THE INVENTION

Accordingly, an object of the present invention is to provide an amorphous non-stretched or an amorphous low-stretched shaped article made of a solid phase-polymerized polyamide MXD6, which shaped article is resistant to an increase in whitening during storage under a high humid condition, upon contacting with water or boiling water or upon heating to a glass transition temperature or higher and is excellent in mechanical properties such as impact resistance. Another object of the present invention is to provide a polyamide resin composition for producing the shaped article.

Japanese Patent Application Laid-Open No. 10-147711 by one of the inventors proposes a polyamide resin composition comprising polyamide resin particles adhered with a lubricant and a specific spreading agent to improve the extrudability of the polyamide resin, in particular, to prevent uneven extrusion while reducing a required extrusion power. The lubricant may be ethylene-bis-stearylamide or a metal salt of a higher fatty acid. However, there is no description therein about the subsequent solid phase polymerization of a melt-polymerized polyamide and the crystallization with whitening of the solid phase-polymerized polyamide with greater ease. In addition, the document addresses nothing about preventing the solid phase-polymerized polyamide from being subject to whitening.

As a result of intense studies, the inventors have found that a shaped article such as a film, a sheet and a hollow container made by fabricating a polyamide resin composition comprising a solid phase-polymerized polyamide incorporated with a predetermined amount of at least one compound selected from the group consisting of a specific metal salt of a fatty acid, diamide compound and diester compound is less subject to whitening during storage under a high humid condition, upon contacting with water or boiling water or upon heating to a glass transition temperature or higher and excellent in mechanical properties such as impact resistance, even when the shaped article is in an amorphous non-stretched state or an amorphous low-stretched state. The present invention has been accomplished based on this finding.

Thus, in a first aspect of the present invention, there is provided a polyamide resin composition comprising 100 parts by weight of a polyamide resin and 0.005 to 1.0 part by weight of at least one compound selected from the group consisting of a metal salt of a fatty acid having 18–50 carbon atoms, a diamide compound obtained from a reaction of a fatty acid having 8–30 carbon atoms and a diamine having 2–10 carbon atoms and a diester compound obtained from a reaction of a fatty acid having 8–30 carbon atoms and a diol having 2–10 carbon atoms, the polyamide resin being obtained by solid phase-polymerizing a polyamide resin prepared by melt-polymerizing a diamine component containing 70 mol % or more of metaxylylenediamine and a dicarboxylic acid component containing 70 mol % or more of adipic acid.

In a second aspect of the present invention, there is provided is a shaped article such as a film, a sheet, a hollow container, etc. obtained by fabricating the polyamide resin composition.

DETAILED DESCRIPTION OF THE INVENTION

The present invention will be described below in more detail.

The polyamide used in the present invention is obtained by melt-polymerizing a diamine component and a dicarboxylic acid component and further by solid phase-polymerizing the resultant melt-polymerized polyamide. The diamine component is required to include 70 mol % or more of metaxylylenediamine. Inclusion of 70 mol % or more of metaxylylenediamine keeps an excellent gas barrier property. Diamines other than metaxylylenediamine are not specifically limited and may include paraxylylenediamine, 1,3-bis(aminomethyl)cyclohexane, 1,4-bis(aminomethyl) cyclohexane, tetramethylenediamine, hexamethylenediamine, nonamethylenediamine, 2-methyl-1,5-pentanediamine, etc.

The dicarboxylic acid component should include 70 mol % or more of adipic acid. Inclusion of 70 mol % or more of adipic acid prevents a deterioration of gas barrier property and a significant decrease in crystallizability. Dicarboxylic acids other than adipic acid are not specifically limited and may include suberic acid, azelaic acid, sebacic acid, 1,10-decanedicarboxylic acid, terephthalic acid, isophtbalic acid, 2,6-naphthalenedicarboxylic acid, etc.

The polyamide used in the present invention may contain a small amount of a monoamine and a monocarboxylic acid added during the condensation polymerization as a molecular weight modifier.

The above polyamide is produced by a melt condensation polymerization. For example, a nylon salt of metaxylylenediamine and adipic acid is heated under pressure in the presence of water thereby directly polycondensating the salt in a molten state while removing the added water and the condensation water. Alternatively, the polyamide is produced by adding metaxylylenediamine directly into a molten adipic acid to conduct the condensation polymerization under normal pressure. In this production method, the melt polymerization is proceeded by continuously adding metaxylylenediamine to adipic acid thereby to keep the reaction system in a uniform liquid state while heating the reaction system to prevent the reaction temperature from becoming lower than the melting points of oligoamide and polyamide being produced.

The relative viscosity of the polyamide having a relatively lower molecular weight obtained by the melt polymerization is usually about 2.28 or less when measured at 25° C. using a solution of 1 g polyamide resin in 100 ml of 96% sulfuric acid. The relative viscosity referred to hereinafter was measured in the same manner. If the relative viscosity of the melt-polymerized polyamide is 2.28 or less, less gel-like substance is produced and a high quality polyamide having an excellent color tone can be obtained.

The melt-polymerized polyamide having a relatively lower molecular weight is subjected to the solid phase polymerization in the form of pellet or powder by heating to a temperature from 150° C. to the melting point of the polyamide under reduced pressure or in an inert gas atmosphere. The relative viscosity of the solid phase-polymerized polyamide is preferably 2.3 to 4.2. With such a range of relative viscosity, the solid phase-polymerized polyamide can be easily fabricated to a film, a sheet and a hollow container, each having excellent properties, especially mechanical properties such as impact resistance. Although some advantages according to the present invention can be obtained even by the use of the melt-polymerized polyamide having a relatively lower molecular weight, the melt-polymerized polyamide is not practical as a material for a film, a sheet and a hollow container because the melt-polymerized polyamide provides shaped articles insufficient in mechanical strength, especially in impact resistance.

The solid phase-polymerized polyamide thus produced is added with at least one compound selected from the group consisting of a metal salt of a fatty acid, a diamide compound and a diester compound to obtain the polyamide resin composition of the present invention.

The metal salt of fatty acid has 18 to 50 carbon atoms, preferably 18 to 34 carbon atoms. With 18 or more carbon atoms, a whitening prevention effect can be expected. With 50 or less carbon atoms, the metal salt of fatty acid can be dispersed uniformly in the resin composition. Although the fatty acid may have a side chain and a double bond, a straight-chain saturated fatty acid such as stearic acid (C18), eicosanoic acid (C20), behenic acid (C22), montanic acid (C28), triacontanoic acid (C30), etc. is preferred. The metal forming a salt together with the fatty acid is not especially limited, and may be exemplified by sodium, potassium, lithium, calcium, barium, magnesium, strontium, aluminum, zinc, etc. Sodium, potassium, lithium, calcium, aluminum and zinc are especially preferred. The metal salt of fatty acid may be used alone or in combination of two or more. In the present invention, the size and shape of the metal salt of fatty acid are not especially limited, and the particle size thereof is preferably 0.2 mm or less because a smaller size makes a uniform dispersion thereof in the resin composition easier.

The diamide compound used in the present invention is obtained from a reaction between a fatty acid having 8 to 30 carbon atoms and a diamine having 2 to 10 carbon atoms. With the fatty acid having 8 or more carbon atoms and the diamine having 2 or more carbon atoms, a whitening prevention effect can be expected. With the fatty acid having 30 or less carbon atoms and the diamine having 10 or less carbon atoms, the diamide compound is readily dispersed uniformly in the resin composition. Although the fatty acid may have a side chain and a double bond, a straight-chain saturated fatty acid such as stearic acid (C18), eicosanoic acid (C20), behenic acid (C22), montanic acid (C28), and triacontanoic acid (C30), etc. is preferred. Examples of the diamine may include ethylenediamine, butylenediamine, hexanediamine, xylylenediamine, bis(aminomethyl) cyclohexane, etc. The diamide compound obtained from any combination of these fatty acid components and diamine components may be used alone or in combination of two or more. A diamide compound obtained from the fatty acid having 8 to 30 carbon atoms and the diamine component mainly comprising ethylenediamine, and a diamide compound obtained from the fatty acid component mainly comprising stearic acid and the diamine having 2 to 10 carbon atoms are preferred. Especially preferred is a diamide compound obtained from the fatty acid component mainly comprising stearic acid and the diamine component mainly comprising ethylenediamine. A diamide compound obtained from a fatty acid component modified with another fatty acid such as sebacic acid to improve heat resistance may be used.

The diester compound used in the present invention is obtained from a fatty acid having 8 to 30 carbon atoms and a diol having 2 to 10 carbon atoms. With the fatty acid having 8 or more carbon atoms and the diol having 2 or more carbon atoms, a whitening prevention effect can be expected. With the fatty acid having 30 or less carbon atoms and the diol having 10 or less carbon atoms, the diester compound is readily dispersed uniformly in the resin composition. Although the fatty acid may have a side chain and a double bond, a straight-chain saturated fatty acid such as stearic acid (C18), eicosanoic acid (C20), behenic acid (C22), montanic acid (C28), triacontanoic acid (C30), etc. is preferred. Examples of the diol may include ethylene glycol, propanediol, butanediol, hexanediol, xylylene glycol, cyclohexanedimethanol, etc. The diester compound obtained from any combination of these fatty acids and diols may be used alone or in combination of two or more. Particularly preferred is a diester compound obtained from a fatty acid component mainly comprising montanic acid and a diol component mainly comprising ethylene glycol and/or 1,3-butanediol.

The metal salt of fatty acid, diamide compound and diester compound described above may be used alone or in combination.

The addition amount of at least one compound selected from the group consisting of the metal salt of fatty acid, the diamide compound and the diester compound is 0.005 to 1.0 part by weight, preferably 0.05 to 0.5 part by weight, and more preferably 0.12 to 0.5 part by weight based on 100 parts by weight of the solid phase-polymerized polyamide. With an addition of 0.005 part by weight or more based on 100 parts by weight of the solid phase-polymerized polyamide, a whitening prevention effect can be expected. With an addition of 1.0 part by weight or less based on 100 parts by weight of the solid phase-polymerized polyamide, the haze value of the shaped article obtained by fabricating the resin composition can be kept low.

Other resins, for example, a polyamide such as nylon 6 and nylon 66, a saturated polyester such as polyethylene terephthalate, a polyolefin such as polyethylene and polypropylene, various elastomers such as a polyolefin elastomer and a polyamide elastomer, an ionomer, etc. may be added to the polyamide resin composition, so long as the object of the present invention, i.e., the prevention of whitening of the shaped article to keep it highly transparent, is not lost. In addition, an additive such as a lubricant, a mold release agent, a stabilizer, an ultraviolet light absorber can be added thereto.

At least one compound (hereinafter referred to as "whitening inhibitor") selected from the group consisting of the metal salt of fatty acid, the diamide compound and the diester compound may be added and mixed with the solid phase-polymerized polyamide by a conventionally known mixing method. For example, a composition containing the whitening inhibitor at a high concentration is diluted with the solid phase-polymerized polyamide pellets containing no whitening inhibitor to a predetermined concentration, and then the resultant mixture is melt-kneaded. After the melt kneading, the mixture may be successively subjected to extrusion or injection molding to give the shaped article. Alternatively, the solid phase-polymerized polyamide pellets and the whitening inhibitor may be mixed in a rotary container.

The polyamide resin composition of the present invention exhibits an excellent inhibiting effect against whitening immediately after fabricated into the shaped article and even after a long-term storage under conditions not causing whitening or conditions preventing the progress of whitening. In other words, after a long-term storage under the condition where whitening is not caused or not promoted even in the absence of the whitening inhibitor, for example, under a condition of 23° C. and 50% RH (relative humidity), the shaped article made of the polyamide resin composition of the present invention retains the whitening inhibiting effect as is the case of immediately after the fabrication even when the shaped article is exposed to a high humid atmosphere, is contacted with water or boiling water or is heated to a glass transition temperature or higher.

The shaped article of the present invention exhibits the whitening inhibiting effect when the shaped article is in an amorphous non-stretched state or in an amorphous low-stretched state, and any shape and any fabricating method are applicable in the present invention. Namely, the shaped article made of the polyamide composition of the present invention efficiently exhibits the whitening inhibiting effect even in the form of a film, a sheet or a hollow container. At least one layer of a multi-layered article such as a multi-layered film, a multi-layered sheet and a multi-layered hollow container may be formed by the polyamide resin composition of the present invention. The layer formed by the polyamide resin composition of the present invention also exhibits the whitening inhibiting effect.

Examples of the present invention and comparative examples are given below by way of illustration of the present invention, but the invention is not intended to be limited thereto. The evaluation methods, etc. used in the examples are as follows:

(1) Measurement of Haze Value

The haze value was measured in accordance with ASTM D-1003 and the results are shown by the values corresponding to a film thickness of 70 $\mu$m.

Measuring apparatus: Color difference meter, model Z-Σ80, manufactured by Nippon Denshoku Kogyo Co., Ltd.

(2) Measuring Conditions of Differential Scanning Colorimeter (DSC)

Apparatus: heat flux differential scanning colorimeter DSC-50 manufactured by Shimadzu Corporation.

Reference substance: α-alumina

Sample amount: 10 mg

Heating speed: 10° C./min

Measuring temperature range: 25 to 300° C.

Atmosphere: Nitrogen gas with a flow rate of 30 ml/min (3) Measurement of Impact Perforating Strength The impact perforating strength was measured at 23° C. under a relative humidity of 50%. A film impact tester (model: ITF-60) manufactured by Tosoku Seimitsu Kogyo Co., Ltd. was used. The impactor had a hemispherical tip with a diameter of 12.7 mm.

The materials, the salts of fatty acids, the diamide compounds and the diester compounds used are abbreviated as follows:

(A) MXD6: Polyamide MXD6.
(B) MoNa: Sodium montanate (manufactured by Clariant Japan Co. Ltd. under the trade name of Hostamont NaV 101).
(C) BeNa: Sodium benzoate.
(D) CaNa: Sodium caprate.
(E) LaNa: Sodium laurate.
(F) MyNa: Sodium myristate.
(G) PaNa: Sodium palmitate.
(H) StNa: Sodium stearate.
(I) MoCa: Calcium montanate (manufactured by Clariant Japan Co. Ltd. under the trade name of Hostamont CaV 102).
(J) EBS: Ethylene-bis-stearylamide (manufactured by NOF Corporation under the trade name of Alflow H-50T).
(K) WH-215: Sebacic acid-modified ethylene-bis-stearylamide (manufactured by Kyoeisha Kagaku Co., Ltd.).
(L) WH-255: Sebacic acid-modified ethylene-bis-stearylamide (manufactured by Kyoeisha Kagaku Co., Ltd.).
(M) EBM: Montanic ester of ethylene glycol and 1,3-butanediol (manufactured by Clariant Japan Co. Ltd. under the trade name: Hext Wax OP).

The measuring conditions of the haze values shown in Tables are as follows:

a) Haze value after 24-hour immersion in distilled water at 23° C.

b) Haze value after 30-minute immersion in warm water at 60° C.

c) Haze value after three-week storage at 40° C. under 80% RH environment.

d) Haze value after 30-minute heat treatment in a hot-air dryer at 100° C.

e) Haze value after three-month storage at 30° C. under 80% RH environment.

f) Haze value after 30-minute immersion in boiling water.

EXAMPLE 1

100 kg of pellets of a polyamide MXD6 (relative viscosity: 2.05) obtained by melt-polymerizing adipic acid and metaxylylenediamine as the raw materials were charged at room temperature into a 250-liter tumbler (rotary vacuum tank) equipped with a jacket for circulating the heating medium. The heating medium was kept at 170° C. until the pellet temperature exceeded 120° C. to crystallize the polyamide MXD6. Then, the heating medium was heated to 230° C. to increase the pellet temperature in the tank to 200° C. During the heating operation, the tank was evacuated to a reduced pressure of 0.5 to 10 Torr when the pellet temperature exceeded 140° C., and thereafter, the heating was continued at 200° C. for 40 minutes. Nitrogen was introduced into the tank to return the inner pressure to a normal pressure, and the cooling was started. When the pellet temperature was lowered to 90° C. or less, the pellets were taken out from the tank. The result of analysis of the pellets after solid phase polymerization showed that the relative viscosity was 2.60.

100 parts by weight of pellets of the resultant solid phase-polymerized polyamide MXD6 and 5.0 parts by weight of sodium montanate (available from Clariant Japan Co. Ltd. under the trade name of Hostamont NaV 101) were melt-kneaded in an extruder to make into pellets.

The resultant pellets containing 5.0 parts by weight of sodium montanate were mixed with pellets containing no sodium montanate to regulate the content of sodium montanate to 0.05 part by weight based on 100 parts by weight of the solid phase-polymerized polyamide MXD6.

The resultant pellets were extruded from a 20-mm single screw extruder at a screw revolution speed of 50 rpm and a take-off speed of 3.0 m/min to produce a non-stretched film having a width of 120 mm and a thickness of 60 to 70 μm. The DSC measurement on a part of the resultant non-stretched film showed that the resultant film was substantially amorphous and had a glass transition temperature of 80° C. Immediately after the extrusion, the film was subjected to moisture conditioning at 23° C. under 50% RH environment for two weeks. The moisture-conditioned film was subjected to each treatment of a) 24-hour immersion in distilled water at 23° C., b) 30-minute immersion in warm water at 60° C., and c) three-week storage at 40° C. under 80% RH environment. The haze values before and after the treatments are shown in Table 1. The impact perforating strength of each resultant film was 1.0 kgf.cm when measured by the film impact tester.

COMPARATIVE EXAMPLE 1

An amorphous non-stretched film was produced from a solid phase-polymerized polyamide MXD6 containing no sodium montanate in the same manner as in Example 1. The film was subjected to the same treatments as in Example 1 to measure the haze values before and after the treatments. The results are shown in Table 1.

EXAMPLES 2 to 6

In the same manner as in Example 1, five types of amorphous non-stretched films were produced from respective pellets having different sodium montanate contents. The films were treated as in Example 1 to measure the haze values before and after the treatments. The results are shown in Table 1. Upon comparing Examples 1 to 6 with Comparative Example 1, it has been found that sodium montanate exhibits the whitening inhibiting effect.

EXAMPLES 7 to 9 and COMPARATIVE EXAMPLES 2 and 3

In the same manner as in Example 1, five types of amorphous non-stretched films were produced from respective pellets having different sodium montanate contents. The films were treated as in Example 1 to measure the haze values before and alter the treatments. The results are shown in Table 1.

TABLE 1

|  | Ex. 1 | Ex. 2 | Ex. 3 | Ex. 4 | Ex. 5 | Ex. 6 |
| --- | --- | --- | --- | --- | --- | --- |
| Material used |  |  |  |  |  |  |
| Solid phase-polymerized polyamide | MXD6 | MXD6 | MXD6 | MXD6 | MXD6 | MXD6 |
| Metal salt of fatty acid | MoNa | MoNa | MoNa | MoNa | MoNa | MoNa |
| Mixing ratio (part by weight) |  |  |  |  |  |  |
| Solid phase-polymerized polyamide | 100 | 100 | 100 | 100 | 100 | 100 |
| Metal salt of fatty acid | 0.05 | 0.1 | 0.15 | 0.3 | 0.4 | 0.5 |
| Haze value (%) |  |  |  |  |  |  |
| Before treatment | 1.4 | 1.7 | 1.8 | 5.5 | 8.0 | 9.7 |
| After water treatment a) | 6.0 | 6.1 | 6.4 | 7.2 | 8.8 | 10.4 |
| After warm water treatment b) | 11.9 | 10.0 | 10.6 | 11.4 | 11.8 | 13.1 |
| After high humid treatment c) | 3.7 | 3.4 | 3.6 | 5.7 | 8.2 | 9.8 |

TABLE 1-continued

|  | Ex. 7 | Ex. 8 | Ex. 9 | Comp. Ex. 1 | Comp. Ex. 2 | Comp. Ex. 3 |
|---|---|---|---|---|---|---|
| Material used |  |  |  |  |  |  |
| Solid phase-polymerized polyamide | MXD6 | MXD6 | MXD6 | MXD6 | MXD6 | MXD6 |
| Metal salt of fatty acid | MoNa | MoNa | MoNa | — | MoNa | MoNa |
| Mixing ratio (part by weight) |  |  |  |  |  |  |
| Solid phase-polymerized polyamide | 100 | 100 | 100 | 100 | 100 | 100 |
| Metal salt of fatty acid | 0.005 | 0.01 | 0.02 | 0 | 0.002 | 1.1 |
| Haze value (%) |  |  |  |  |  |  |
| Before treatment | 1.5 | 1.4 | 1.1 | 1.1 | 1.0 | 20.3 |
| After water treatment a) | 10.6 | 9.9 | 8.5 | 82.4 | 55.0 | 21.4 |
| After warm water treatment b) | 54.6 | 34.1 | 24.3 | 55.1 | 78.0 | 26.9 |
| After high humid treatment c) | 7.1 | 5.0 | 4.0 | 21.1 | 8.5 | 20.7 |

COMPARATIVE EXAMPLES 4 to 8

In the same manner as in Example 1, five types of amorphous non-stretched films were produced from each polyamide pellet respectively containing, in place of sodium montanate, sodium benzoate, sodium caprate, sodium laurate, sodium myristate and sodium palmitate in an amount of 0.2 part by weight per 100 parts by weight of the solid phase-polymerized polyamide MXD6. The films were treated as in Example 1 to measure the haze values before and after the treatments. The results are shown in Table 2.

Upon comparing Examples 1 to 6 and Comparative Examples 4 to 8, it can be seen that the metal salt of fatty acid having 16 or less carbon atoms exhibits no whitening inhibiting effect.

TABLE 2

|  | Comp. Ex. 4 | Comp. Ex. 5 | Comp. Ex. 6 | Comp. Ex. 7 | Comp. Ex. 8 |
|---|---|---|---|---|---|
| Material used |  |  |  |  |  |
| Solid phase-polymerized polyamide | MXD6 | MXD6 | MXD6 | MXD6 | MXD6 |
| Metal salt of fatty acid | BeNa | CaNa | LaNa | MyNa | PaNa |
| Mixing ratio (part by weight) |  |  |  |  |  |
| Solid phase-polymerized polyamide | 100 | 100 | 100 | 100 | 100 |
| Metal salt of fatty acid | 0.2 | 0.2 | 0.2 | 0.2 | 0.2 |
| Haze value (%) |  |  |  |  |  |
| Before treatment | 1.3 | 1.1 | 1.1 | 1.0 | 1.1 |
| After water treatment a) | 85.9 | 82.6 | 88.1 | 85.4 | 44.3 |
| After warm water treatment b) | 59.2 | 51.3 | 67.2 | 65.6 | 73.5 |
| After high humid treatment c) | 19.1 | 18.4 | 21.2 | 20.9 | 21.9 |

EXAMPLE 10

An amorphous non-stretched film was produced in the same manner as in Example 1 except that 0.2 part by weight of sodium stearate, in place of sodium montanate, was used per 100 parts by weight of the solid phase-polymerized polyamide MXD6. The film was treated as in Example 1 to measure the haze values before and after the treatments. The results are shown in Table 3.

EXAMPLE 11

An amorphous non-stretched film was produced in the same manner as in Example 1 except that 0.05 part by weight of calcium montanate (available from Clariant Japan Co. Ltd. under the trade name of Hostamont CaV 102), in place of sodium montanate, was used per 100 parts by weight of the solid-phase polymerized polyamide MXD6. The film was treated as in Example 1 to measure the haze values before and after the treatments. The results are shown in Table 3.

EXAMPLES 12 and 13

Two types of amorphous non-stretched films were produced in the same manner as in EXAMPLE 11 except that the content of calcium montanate was changed. The film was treated as in Example 11 to measure the haze values before and after the treatments. The results are shown in Table 3.

TABLE 3

|  | Ex. 10 | Ex. 11 | Ex. 12 | Ex. 13 |
|---|---|---|---|---|
| Material used |  |  |  |  |
| Solid phase-polymerized polyamide | MXD6 | MXD6 | MXD6 | MXD6 |
| Metal salt of fatty acid | StNa | MoCa | MoCa | MoCa |
| Mixing ratio (part by weight) |  |  |  |  |
| Solid phase-polymerized polyamide | 100 | 100 | 100 | 100 |
| Metal salt of fatty acid | 0.2 | 0.05 | 0.1 | 0.2 |
| Haze value (%) |  |  |  |  |
| Before treatment | 1.3 | 1.0 | 1.4 | 2.9 |
| After water treatment a) | 8.9 | 3.2 | 2.7 | 3.4 |
| After warm water treatment b) | 9.1 | 11.3 | 11.0 | 10.7 |
| After high humid treatment c) | — | 1.9 | 2.0 | 3.4 |

EXAMPLES 14 to 16

The three types of amorphous non-stretched films obtained in Examples 2, 10 and 13 were subjected to moisture conditioning at 23° C. under 50% RH environment for two weeks and were then heated in a hot-air dryer at 100° C. for 30 minutes to measure the haze values before and after the treatment. The results are shown in Table 4.

COMPARATIVE EXAMPLE 9

The amorphous non-stretched film obtained in Comparative Example 1 was subjected to moisture conditioning at 23° C. under 50% RH environment for two weeks and were then heated in a hot-air dryer at 100° C. for 30 minutes to measure the haze values before and after the treatment. The results are shown in Table 4.

Upon comparing Examples 14–16 and Comparative Example 9, the salt of fatty acid of the present invention exhibits the whitening inhibiting effect even when dry-heated.

TABLE 4

|  | Ex. 14 | Ex. 15 | Ex. 16 | Comp. Ex. 9 |
|---|---|---|---|---|
| Material used |  |  |  |  |
| Solid phase-polymerized polyamide | MXD6 | MXD6 | MXD6 | MXD6 |
| Metal salt of fatty acid | MoNa | StNa | MoCa | — |
| Mixing ratio (part by weight) |  |  |  |  |
| Solid phase-polymerized polyamide | 100 | 100 | 100 | 100 |
| Metal salt of fatty acid | 0.1 | 0.2 | 0.2 | 0 |
| Haze value (%) |  |  |  |  |
| Before treatment | 1.7 | 1.1 | 3.2 | 1.1 |
| After dry-heat treatment d) | 5.2 | 3.2 | 9.0 | 20.2 |

EXAMPLES 17 and 18

Two types of pellets containing 0.1 and 0.2 part by weight of sodium montanate (available from Clariant Japan Co. Ltd. under the trade name of Hostamont NaV 101) based on 100 parts by weight of a solid phase-polymerized polyamide MXD6 (relative viscosity: 2.60) were obtained as in Example 1. Amorphous non-stretched films having a thickness of 70 μm made of respective pellets had the haze values of 5.9% and 6.9% after immersed in distilled water at 23° C. for 24 hours. In each Example, the solid phase-polymerized polyamide MXD6 containing sodium montanate and polyethylene terephthalate (PET: available from Nippon Unipet Co., Ltd. under the trade name of RT543C) were separately injection-molded using a twin-cylinder injection molding machine in the order of PET, polyamide MXD6, PET, to form a five-layered parison (PET/MXD6/PET/MXD6/PET) where the PET layer and the solid phase-polymerized polyamide layer were alternately laminated. The parison had an outer diameter of 25 mm, a length of 110 mm and a thickness of 4.5 mm. The amount of the solid phase-polymerized polyamide MXD6 used was 10% by weight based on the whole weight of the parison.

The parison thus obtained was blown using a blow molding machine to produce a 700-ml multi-layered hollow container in the form of bottle. Immediately after the blow molding, the multi-layered hollow container was stored under the conditions of 30° C. and 80% RH for three months. From a low-stretched portion (stretch ratio: 1 to 1.5 times by area) of the container, a solid phase-polymerized polyamide MXD6 layer was taken to measure the haze value. The result is shown in Table 5.

COMPARATIVE EXAMPLE 10

A multi-layered hollow container in the form of bottle was produced as in Examples 17 and 18 except that a solid phase-polymerized polyamide MXD6 containing no sodium montanate was used. The resultant container was stored under the conditions of 30° C. and 80% RH for three months. From a low-stretched portion (stretch ratio: 1 to 1.5 times by area) of the container, a solid phase-polymerized polyamide MXD6 layer was taken to measure the haze value. The result is shown in Table 5.

Upon comparing Examples 17 and 18 and Comparative Example 10, it can be seen that the metal salt of fatty acid of the present invention exhibits the whitening inhibiting effect even in a multi-layered hollow container.

EXAMPLE 19

Pellets containing 0.1 part by weight of calcium montanate (available from Clariant Japan Co. Ltd. under the trade name of Hostamont CaV 102) based on 100 parts by weight of a solid phase-polymerized polyamide MXD6 (relative viscosity: 2.60) were obtained as in Example 1. An amorphous non-stretched film having a thickness of 70 μm made of the pellets had a haze value of 2.7 % after immersed in distilled water at 23° C. for 24 hours. The solid phase-polymerized polyamide MXD6 containing calcium montanate and polyethylene terephthalate (PET: available from Nippon Unipet Co., Ltd. under the trade name of RT543C) were separately injection-molded using a twin-cylinder injection molding machine in the order of PET, polyamide MXD6, PET, to form a five-layered parison (PET/MXD6/PET/MXD6/PET) where the PET layer and the solid phase-polymerized polyamide layer were alternately laminated. The parison had an outer diameter of 25 mm, a length of 110 mm and a thickness of 4.5 mm. The amount of the solid phase-polymerized polyamide MXD6 used was 10% by weight based on the whole weight of the parison.

The parison thus obtained was blown using a blow molding machine to produce a 700-ml multi-layered hollow container in the form of bottle. Immediately after the blow molding, the multi-layered hollow container was stored under the conditions of 30° C. and 80% RH for three months. From a low-stretched portion (stretch ratio: 1 to 1.5 times by area) of the container, the solid phase-polymerized polyamide MXD6 layer was taken to measure the haze value. The result is shown in Table 5.

TABLE 5

|  | Ex. 17 | Ex. 18 | Ex. 19 | Comp. Ex. 10 |
|---|---|---|---|---|
| Material used |  |  |  |  |
| Solid phase-polymerized polyamide | MXD6 | MXD6 | MXD6 | MXD6 |
| Metal salt of fatty acid | MoNa | MoNa | MoCa | — |
| Mixing ratio (part by weight) |  |  |  |  |
| Solid phase-polymerized polyamide | 100 | 100 | 100 | 100 |
| Metal salt of fatty acid | 0.1 | 0.2 | 0.1 | 0 |
| Haze value (%) |  |  |  |  |
| After high humid treatment e) | 6.5 | 5.6 | 5.0 | 13.9 |

COMPARATIVE EXAMPLE 11

In the same manner as in Example 1, pellets containing 0.05 part by weight of sodium montanate (available from Clariant Japan Co. Ltd. under the trade name of Hostamont NaV 101) based on 100 parts by weight of a melt-polymerized polyamide MXD6 were prepared by using the melt-polymerized polyamide MXD6 pellets (a diameter of 3 mm and a height of 3 mm) having a relative viscosity of 2.05 instead of the solid phase-polymerized polyamide MXD6 having a relative viscosity of 2.60.

The resultant pellets were extruded from a 20-mm single screw extruder at a screw revolution speed of 50 rpm and a take-off speed of 3.0 m/min to produce a non-stretched film having a width of 120 mm and a thickness of 60 to 70 μm. The DSC measurement on a part of the resultant non-stretched film showed that the resultant film was substantially amorphous and had a glass transition temperature of 80° C.

Immediately after the extrusion, the film was subjected to moisture conditioning at 23° C. under 50% RH environment for two weeks. The moisture-conditioned film was subjected to each treatment of a) 24-hour immersion in distilled water at 23° C., b) 30-minute immersion in warm water at 60° C., and c) three-week storage at 40° C. under 80% RH environment. The haze values before and after the treatments were measured. The haze value before treatment was 1.4%, the haze value after immersion in distilled water at 23° C. for 24 hours was 5.8%, the haze value after immersion in warm water at 60° C. for 30 minutes was 2.1%, and the haze value after storage at 40° C. under 80% RH environment for three weeks was 3.5%. The impact perforating strength of each resultant film was 0.5 kgf.cm or less when measured by the film impact tester.

EXAMPLE 20

100 kg of pellets of a polyamide MXD6 (relative viscosity: 2.05) obtained by melt-polymerizing adipic acid and metaxylylenediamine as the raw materials were charged at room temperature into a 250-liter tumbler (rotary vacuum tank) equipped with a jacket for circulating the heating medium. The heating medium was kept at 170° C. until the pellet temperature exceeded 120° C. to crystallize the polyamide MXD6. The heating medium was heated to 230° C. to increase the pellet temperature in the tank to 200° C. During the heating operation, the tank was evacuated to a reduced pressure of 0.5 to 10 Torr when the pellet temperature exceeded 140° C., and thereafter, the heating was continued at 200° C. for 40 minutes. Nitrogen was introduced into the tank to return the inner pressure to normal pressure, and the cooling was started. When the pellet temperature was lowered to 90° C. or less, the pellets were taken out from the tank. The result of analysis of the pellets after the solid phase polymerization showed that the relative viscosity was 2.60.

100 parts by weight of the resultant solid phase-polymerized polyamide MXD6 pellets and 5.0 parts of ethylene-bis-stearylamide (trade name: Alflow H-50T) were melt-kneaded in an extruder to be made into pellets.

The resultant pellets containing 5.0 parts by weight of ethylene-bis-stearylamide were mixed with pellets containing no ethylene-bis-stearylamide, thereby adjusting the content of ethylene-bis-stearylamide to 0.1 part by weight based on 100 parts by weight of the solid phase-polymerized polyamide MXD6.

The resultant pellets were extruded from a 20-mm single screw extruder at a screw revolution speed of 50 rpm and a take-off speed of 3.0 m/min to produce a non-stretched film having a width of 120 mm and a thickness of 60 to 70 μm. The DSC measurement on a part of the resultant non-stretched film showed that the resultant film was substantially amorphous and had a glass transition temperature of 80° C. Immediately after the extrusion, the film was subjected to moisture conditioning at 23° C. under 50% RH environment for two weeks. The moisture-conditioned film was subjected to each treatment of a) 24-hour immersion in distilled water at 23° C., b) 30-minute immersion in warm water at 60° C., f) 30-minute immersion in boiling water, and c) three-week storage at 40° C. under 80% RH environment. The haze values before and after the treatments are shown in Table 6. The impact perforating strength of each film thus treated was 1 to 1.5 kgf.cm when subjected to the moisture conditioning again at 23° C. and 50% RH for three weeks.

COMPARATIVE EXAMPLES 12 and 13

Each amorphous non-stretched film was produced in the same manner as in Example 20 except that no ethylene-bis-stearylamide was added (Comparative Example 12) and 0.002 part by weight of ethylene-bis-stearylamide was added (Comparative Example 13). The films were treated as in Example 20 to measure the haze values before and after the treatments. The results are shown in Table 6.

The films of Comparative Example 12 thus treated were subjected to moisture conditioning at 23° C. under 50% RH environment for two weeks. The impact perforating strength of the resultant film was 1.0 kgf.cm for the film subjected to the high humid treatment (c) and 0.5 kgf.cm or less for the films subjected to the other treatments (a, b and f).

EXAMPLES 21 to 26

Six types of amorphous non-stretched films were produced as in Example 20 except that the content of ethylene-bis-stearylamide was changed. The films were treated as in Example 20 to measure the haze values before and after the treatments. The results are shown in Table 6.

Upon comparing Examples 20 to 26 and Comparative Examples 12 and 13, ethylene-bis-stearylamide exhibits an excellent whitening inhibiting effect.

TABLE 6

| | Ex. 20 | Ex. 21 | Ex. 22 | Ex. 23 | Ex. 24 |
|---|---|---|---|---|---|
| Material used | | | | | |
| Solid phase-polymerized polyamide | MXD6 | MXD6 | MXD6 | MXD6 | MXD6 |
| Diamide compound | EBS | EBS | EBS | EBS | EBS |
| Mixing ratio (part by weight) | | | | | |
| Solid phase-polymerized polyamide | 100 | 100 | 100 | 100 | 100 |
| Diamide compound | 0.1 | 0.15 | 0.2 | 0.02 | 0.05 |
| Haze value (%) | | | | | |
| Before treatment | 0.9 | 0.9 | 1.0 | 0.7 | 0.8 |
| After water treatment a) | 3.9 | 3.5 | 3.7 | 9.0 | 4.2 |
| After warm water treatment b) | 3.1 | 2.8 | 2.6 | 36.4 | 6.0 |
| Water boiled water treatement f) | 17.4 | 10.6 | 7.6 | 63.0 | 57.2 |
| After high humid treatment c) | 1.6 | 1.2 | 1.3 | 3.4 | 1.9 |

| | Ex. 25 | Ex. 26 | Comp. Ex. 12 | Comp. Ex. 13 |
|---|---|---|---|---|
| Material used | | | | |
| Solid phase-polymerized polyamide | MXD6 | MXD6 | MXD6 | MXD6 |
| Diamide compound | EBS | EBS | — | EBS |
| Mixing ratio (part by weight) | | | | |
| Solid phase-polymerized polyamide | 100 | 100 | 100 | 100 |
| Diamide compound | 0.08 | 0.3 | 0 | 0.002 |
| Haze value (%) | | | | |
| Before treatment | 0.9 | 2.1 | 0.8 | 0.8 |
| After water treatment a) | 3.7 | 7.2 | 89.5 | 86.7 |

TABLE 6-continued

| | | | | |
|---|---|---|---|---|
| After warm water treatment b) | 3.8 | 3.5 | 57.1 | 56.6 |
| After boiling water treatment f) | 29.1 | 6.0 | 77.3 | 77.5 |
| After high humid treatment c) | 1.5 | 3.2 | 15.2 | 15.1 |

EXAMPLES 27 to 29

Three types of amorphous non-stretched films were produced as in Example 20 except that sebacic acid-modified ethylene-bis-stearylamide (manufactured by Kyoeisha Kagaku Co., Ltd. under the trade name of WH-215) was used in different amounts instead of using ethylene-bis-stearylamide. The films were treated as in Example 20 to measure the haze values before and after the treatments. The results are shown in Table 7.

EXAMPLES 30 to 32

Three types of amorphous non-stretched films were produced as in Example 20 except that sebacic acid-modified ethylene-bis-stearylamide (manufactured by Kyoeisha Kagaku Co., Ltd. under the trade name of WH-255) was used in different amounts instead of using ethylene-bis-stearylamide. The films were treated as in Example 20 to measure the haze values before and after the treatments. The results are shown in Table 7.

TABLE 7

| | Ex. 27 | Ex. 28 | Ex. 29 | Ex. 30 | Ex. 31 | Ex. 32 |
|---|---|---|---|---|---|---|
| Material used | | | | | | |
| Solid phase-polymerized polyamide | MXD6 | MXD6 | MXD6 | MXD6 | MXD6 | MXD6 |
| Diamide compound | WH-215 | WH-215 | WH-215 | WH-255 | WH-255 | WH-255 |
| Mixing ratio (part by weight) | | | | | | |
| Solid phase-polymerized polyamide | 100 | 100 | 100 | 100 | 100 | 100 |
| Diamide compound | 0.05 | 0.12 | 0.2 | 0.05 | 0.1 | 0.2 |
| Haze value (%) | | | | | | |
| Before treatment | 0.9 | 0.9 | 1.0 | 0.8 | 0.8 | 1.0 |
| After water treatment a) | 3.8 | 3.6 | 3.3 | 4.6 | 3.6 | 3.3 |
| After warm water treatment b) | 7.9 | 3.5 | 2.7 | 5.3 | 4.4 | 2.8 |
| After boiling water treatment f) | 61.1 | 24.1 | 7.5 | 84.5 | 41.2 | 15.6 |
| After high humid treatment c) | 2.0 | 1.4 | 1.5 | 2.8 | 1.5 | 1.4 |

EXAMPLES 33 to 35

Three types of amorphous non-stretched films were produced as in Example 20 except that ethylene glycol and 1,3-butanediol-montanic ester (manufactured by Clariant Japan Co. Ltd. under the trade name of Hext Wax OP) was used in different amounts instead of using ethylene-bis-stearylamide. The films were treated as in Example 20 to measure the haze values before and after the treatment. The results are shown in Table 8.

TABLE 8

| | Ex. 33 | Ex. 34 | Ex. 35 |
|---|---|---|---|
| Material used | | | |
| Solid phase-polymerized polyamide | MXD6 | MXD6 | MXD6 |
| Diester compound | EBM | EBM | EBM |
| Mixing ratio (part by weight) | | | |
| Solid phase-polymerized polyamide | 100 | 100 | 100 |
| Diester compound | 0.05 | 0.1 | 0.2 |
| Haze value (%) | | | |
| Before treatment | 2.2 | 2.8 | 4.2 |
| After water treatment a) | 6.4 | 7.1 | 6.0 |
| After warm water treatment b) | 21.1 | 19.4 | 16.5 |
| After high humid treatment c) | 3.3 | 3.7 | 4.9 |

COMPARATIVE EXAMPLE 14

An amorphous non-stretched film was tried to be produced as in Example 20 except that the content of ethylene-bis-stearylamide was changed to 1.5 parts by weight. However, no film having a sufficient strength for the treatments was obtained due to excess bubbling.

EXAMPLES 36 and 37

The two types of amorphous non-stretched films obtained in Examples 20 and 22 were subjected to moisture conditioning at 23° C. under 50% RH environment for two weeks and were then heated in a hot-air dryer at 100° C. for 30 minutes to measure the haze values before and after the treatment. The results are shown in Table 9.

COMPARATIVE EXAMPLE 15

The amorphous non-stretched film obtained in Comparative Example 12 was subjected to moisture conditioning at 23° C. under 50% RH environment for two weeks and was then heated in a hot-air dryer at 100° C. for 30 minutes to measure the haze values before and after the treatment. The results are shown in Table 9.

Upon comparing Examples 36 and 37 and Comparative Example 15, it would appear that the diamide compound of the present invention exhibits the whitening inhibiting effect even when dry-heated.

TABLE 9

|  | Ex. 36 | Ex. 37 | Comp. Ex. 15 |
|---|---|---|---|
| Material used |  |  |  |
| Solid phase-polymerized polyamide | MXD6 | MXD6 | MXD6 |
| Diamide compound | EBS | EBS | — |
| Mixing ratio (part by weight) |  |  |  |
| Solid phase-polymerized polyamide | 100 | 100 | 100 |
| Diamide compound | 0.1 | 0.2 | 0 |
| Haze value (%) |  |  |  |
| Before treatment | 0.9 | 1.0 | 0.8 |
| After dry heat treatment d) | 3.8 | 2.0 | 20.7 |

TABLE 10

|  | Ex. 38 | Comp. Ex. 16 |
|---|---|---|
| Material used |  |  |
| Solid phase-polymerized polyamide | MXD6 | MXD6 |
| Diamide compound | EBS | — |
| Mixing ratio (part by weight) |  |  |
| Solid phase-polymerized polyamide | 100 | 100 |
| Diamide compound | 0.1 | 0 |
| Haze value (%) |  |  |
| after high humid treatment e) | 5.5 | 13.9 |

EXAMPLE 38

Polyamide MXD6 pellets containing 0.1 part by weight of ethylene-bis-stearylamide (trade name: Alflow H-50T) based on 100 parts by weight of a solid phase-polymerized polyamide MXD6 (relative viscosity: 2.60) were obtained as in Example 20. An amorphous non-stretched film having a thickness of 70 μm made of the pellets was immersed in distilled water at 23° C. for 24 hours. The haze value of the film after immersion was 3.9%. The solid phase-polymerized polyamide MXD6 containing ethylene-bis-stearylamide and polyethylene terephthalate (PET: manufactured by Nippon Unipet Co., Ltd. under the trade name of RT543C) were separately injection-molded from a twin-cylinder injection molding machine in the order of PET, polyamide MXD6, PET, to form a five-layered parison (PET/MXD6/PET/MXD6/PET) where the PET layer and the solid phase-polymerized polyamide MXD6 layer were alternately laminated.

The parison had an outer diameter of 25 mm, a length of 110 mm and a thickness of 4.5 mm. The amount of the solid phase-polymerized polyamide MXD6 used was 10% by weight based on the whole weight of the parison.

The parison thus obtained was blown using a blow molding machine to produce a 700-ml multi-layered hollow container in the form of bottle. Immediately after the blow molding, the container was stored at 30° C. under 80% RH environment for three months. From a low-stretched portion (stretch ratio: 1 to 1.5 times by area) of the container, the solid phase-polymerized polyamide MXD6 layer was taken to measure the haze value. The result is shown in Table 10.

COMPARATIVE EXAMPLE 16

A multi-layered hollow container in the form of bottle was produced as in Example 38 except that no ethylene-bis-stearylamide was added and was stored at 30° C. under 80% RH environment for three months. From a low-stretched portion (stretch ratio: 1 to 1.5 times by area) of the container, the solid phase-polymerized polyamide MXD6 layer was taken to measure the haze value. The result is shown in Table 10.

Upon comparing Example 38 and Comparative Example 16, it can be seen that the diamide compound of the present invention exhibits the whitening inhibiting effect even in a multi-layered hollow container.

COMPARATIVE EXAMPLE 17

Pellets containing 0.1 part by weight of ethylene-bis-stearylamide based on 100 parts by weight of polyamide MXD6 were produced in the same manner as in Example 20 except that a melt-polymerized polyamide MXD6 having a relative viscosity of 2.05 was used instead of the solid phase-polymerized polyamide MXD6 having a relative viscosity of 2.90.

The resultant pellets were extruded from a 20-mm single screw extruder at a screw revolution speed of 50 rpm and a take-off speed of 3.0 m/min to produce a non-stretched film having a width of 120 mm and a thickness of 60 to 70 μm. The DSC measurement on a part of the resultant non-stretched film showed that the resultant film was substantially amorphous and had a glass transition temperature of 80° C.

Immediately after the extrusion, the film was subjected to moisture conditioning at 23° C. under 50% RH environment for two weeks. The moisture-conditioned film was subjected to each treatment of a) 24-hour immersion in distilled water at 23° C., b) 30-minute immersion in warm water at 60° C., f) 30-minute immersion in boiling water, and c) three-week storage at 40° C. under 80% RH environment to measure the haze values before and after the treatments.

The haze value before treatment was 1.0%, the haze value after immersion in distilled water at 23° C. for 24 hours was 3.7%, the haze value after immersion in warm water at 60° C. for 30 minutes was 3.3%, the haze value after immersion in boiling water for 30 minutes was 17.8%, and the haze value after storage at 40° C. under 80% RH environment for three weeks was 1.7%. The treated films were subjected to moisture conditioning again at 23° C. under 50% RH environment for two weeks. The impact perforating strength of the resultant films was 0.5 kgf.cm or less.

COMPARATIVE EXAMPLE 18

100 parts by weight of the solid phase-polymerized polyamide MXD6 pellets obtained in Example 20 and 3 parts by weight of organic-treated montmorillonite (manufactured by Shiraishi Kogyo Co., Ltd. under the trade name of Olben) were mixed in a tumbler. The resultant mixture was extruded from a 20-mm single screw extruder at a screw revolution speed of 80 rpm and a take-off speed of 3.0 m/min at an extrusion temperature of 270° C. to produce a non-stretched film having a width of 120 mm and a thickness of 60 to 70 μm.

The DSC measurement on a part of the resultant non-stretched film showed that the resultant film was substantially amorphous and had a glass transition temperature of 80° C. Immediately after the extrusion, the film was subjected to moisture conditioning at 23° C. under 50% RH environment for two weeks. The haze value of the moisture-conditioned film was 1.5%. After immersed in distilled water at 23° C. for 24 hours, the moisture-conditioned film showed a haze value of 4.5%. The treated film was subjected to moisture conditioning again at 23° C. under 50% RH environment for two weeks. The impact perforating strength of the resultant film was 0.5 kgf.cm.

As described above, the shaped article such as films, sheets and hollow containers of the present invention is made of a polyamide resin composition where a predetermined amount of at least one compound selected from the group consisting of a specific metal salt of fatty acid, a diamide compound obtained from a specific fatty acid and a specific diamine and a diester compound obtained from a specific fatty acid and a specific diol is blended with a polyamide MXD6 obtained by further solid phase-polymerizing a melt-polymerized polyamide MXD6. The films, sheets and hollow containers are resistant against being subject to whitening and maintain transparency upon heating to a glass transition temperature or higher, during storage under a high humid condition, or upon contacting with water, particularly boiling water, even if the shaped article is in an amorphous non-stretched or amorphous low-stretched state.

What is claimed is:

1. A polyamide resin shaped article selected from the group consisting of films, sheets and hollow containers, which is made of a polyamide resin composition comprising 100 parts by weight of a polyamide resin and 0.005 to 1.0 part by weight of at least one compound selected from the group consisting of (a) a metal salt of a fatty acid having 18–50 carbon atoms, (b) a diamide compound which is a reaction product of a fatty acid component having 8–30 carbon atoms and a diamine component having 2–10 carbon atoms and (c) a diester compound which is a reaction product of a fatty acid component having 8–30 carbon atoms and a diol component having 2–10 carbon atoms, said polyamide resin being produced by solid phase-polymerizing a polyamide resin prepared by melt-polymerizing a diamine component containing 70 mol % or more of metaxylylenediamine and a dicarboxylic acid component containing 70 mol % or more of adipic acid.

2. The polyamide resin shaped article according to claim 1, wherein a relative viscosity of said polyamide resin produced by solid phase polymerization is 2.3 to 4.2 when measured at 25° C. using a solution of 1 g polyamide resin in 100 ml of 96% sulfuric acid.

3. A multi-layered polyamide resin shaped article selected from the group consisting of films, sheets and hollow containers, having at least one layer made of a polyamide resin composition comprising 100 parts by weight of a polyamide resin and 0.005 to 1.0 part by weight of at least one compound selected from the group consisting of (a) a metal salt of a fatty acid having 18–50 carbon atoms, (b) a diamide compound which is a reaction product of a fatty acid having 8–30 carbon atoms and a diamine having 2–10 carbon atoms and (c) a diester compound which is a reaction product of a fatty acid having 8–30 carbon atoms and a diol having 2–10 carbon atoms, said polyamide resin being produced by solid phase-polymerizing a polyamide resin prepared by melt-polymerizing a diamine component containing 70 mol % or more of metaxylylenediamine and a dicarboxylic acid component containing 70 mol % or more of adipic acid.

4. The multi-layered polyamide resin shaped article according to claim 3, wherein a relative viscosity of said polyamide resin produced by solid phase polymerization is 2.3 to 4.2 when measured at 25° C. using a solution of 1 g polyamide resin in 100 ml of 96% sulfuric acid.

5. The polyamide resin shaped article according to claim 1, wherein said hollow containers are bottles.

6. The multi-layered polyamide resin shaped article according to claim 3, wherein said hollow containers are bottles.

7. The polyamide resin shaped article according to claim 1, which contains said metal salt of a fatty acid and said metal salt of a fatty acid includes (i) a metal selected from the group consisting of sodium, potassium, lithium, calcium, barium, magnesium, strontium, aluminum and zinc; and (ii) a fatty acid selected from the group consisting of stearic acid, eicosanoic acid, behenic acid, montanic acid and triacontanoic acid.

8. The polyamide resin shaped article according to claim 1, which contains said diamide compound and said diamide compound is a reaction product of (i) a fatty acid component selected from the group consisting of stearic acid, eicosanoic acid, behenic acid, montanic acid and triacontanoic acid, and (ii) a diamine component which is ethylenediamine.

9. The polyamide resin shaped article according to claim 8, which contains said diamide compound and said diamide compound is a reaction product of (i) stearic acid and (ii) ethylenediamine.

10. The polyamide resin shaped article according to claim 1, which contains said diester compound and said diester compound is a reaction product of (i) a fatty acid component selected from the group consisting of stearic acid, eicosanoic acid, behenic acid, montanic acid and triacontanoic acid, and (ii) a diol component selected from the group consisting of ethylene glycol, propanediol, butanediol, hexanediol, xylylene glycol and cyclohexanedimethanol.

11. The polyamide resin shaped article according to claim 10, which contains said diester compound and said diester compound is a reaction product of (i) montanic acid and (ii) a diol component selected from the group consisting of ethylene glycol and 1,3-butanediol.

12. The polyamide resin shaped article according to claim 1, wherein the at least one compound selected from the group consisting of (a) a metal salt of a fatty acid, (b) a diamide compound and (c) a diester compound is in an amount of 0.05 to 0.5 part by weight based on 100 parts by weight of the solid phase-polymerized product.

13. The polyamide resin shaped article according to claim 1, wherein the at least one compound selected from the group consisting of (a) a metal salt of a fatty acid, (b) a diamide compound and (c) a diester compound is in an amount of 0.12 to 0.5 part by weight based on 100 parts by weight of the solid phase-polymerized product.

14. The multi-layered polyamide resin shaped article according to claim 3, which contains said metal salt of a fatty acid and said metal salt of a fatty acid includes (i) a metal selected from the group consisting of sodium, potassium, lithium, calcium, barium, magnesium, strontium, aluminum and zinc; and (ii) a fatty acid selected from the group consisting of stearic acid, eicosanoic acid, behenic acid, montanic acid and triacontanoic acid.

15. The multi-layered polyamide resin shaped article according to claim 3, which contains said diamide compound and said diamide compound is a reaction product of (i) a fatty acid component selected from the group consisting of stearic acid, eicosanoic acid, behenic acid, montanic acid and triacontanoic acid, and (ii) a diamine component which is ethylenediamine.

16. The multi-layered polyamide resin shaped article according to claim 15, which contains said diamide compound and said diamide compound is a reaction product of (i) stearic acid and (ii) ethylenediamine.

17. The multi-layered polyamide resin shaped article according to claim 3, which contains said diester compound and said diester compound is a reaction product of (i) a fatty acid component selected from the group consisting of stearic acid, eicosanoic acid, behenic acid, montanic acid and triacontanoic acid, and (ii) a diol component selected from the group consisting of ethylene glycol, propanediol, butanediol, hexanediol, xylylene glycol and cyclohexanedimethanol.

18. The multi-layered polyamide resin shaped article according to claim 17, wherein the diester compound is a reaction product of (i) montanic acid and (ii) a diol component selected from the group consisting of ethylene glycol and 1,3-butanediol.

19. The multi-layered polyamide resin shaped article according to claim 3, wherein the at least one compound selected from the group consisting of (a) a metal salt of a fatty acid, (b) a diamide compound and (c) a diester compound is in an amount of 0.05 to 0.5 part by weight based on 100 parts by weight of the solid phase-polymerized product.

20. The multi-layered polyamide resin shaped article according to claim 3, wherein the at least one compound selected from the group consisting of (a) a metal salt of a fatty acid, (b) a diamide compound and (c) a diester compound is in an amount of 0.12 to 0.5 part by weight based on 100 parts by weight of the solid phase-polymerized product.

* * * * *